United States Patent [19]

Ingram, Jr. et al.

[11] 4,176,855
[45] Dec. 4, 1979

[54] GATE DEVICE

[75] Inventors: James R. Ingram, Jr., Dallas; George A. Kiesel, Irving, both of Tex.

[73] Assignee: Recognition Equipment Incorporated, Dallas, Tex.

[21] Appl. No.: 960,211

[22] Filed: Nov. 13, 1978

[51] Int. Cl.$^2$ .......................... G06K 13/07; B65H 5/22
[52] U.S. Cl. ........................................ 235/480; 271/3; 271/DIG. 9
[58] Field of Search .................... 235/475, 480; 271/3, 271/272, 273, 274, 64

[56] References Cited

U.S. PATENT DOCUMENTS

| | | | |
|---|---|---|---|
| 3,114,150 | 12/1963 | Calano et al. | 235/480 |
| 3,755,653 | 8/1973 | Venker | 235/480 |
| 4,007,356 | 2/1977 | Stucke et al. | 235/480 |

*Primary Examiner*—Daryl W. Cook
*Attorney, Agent, or Firm*—John E. Vandigriff

[57] ABSTRACT

Flexible material secured at one end and pressed against a document guide of the other end is used to provide a directional document guide and diverter. Dual fingers press against the guide with a feed belt moving through a slot in the diverter. The document forces the diverter to one side permitting the document to pass therethrough. However, upon return the diverter changes the course of the document directing it away from its original input position to a storage hopper.

5 Claims, 5 Drawing Figures

GATE DEVICE

FIELD OF THE INVENTION

This invention relates to the handling and transporting of documents and more particularly to a diverter for passing a document in one direction but diverting it changing its direction when the document direction is reversed, without the need for an external actuating source i.e., solenoid or motor deflecting the document to a separate path or into a storage hopper.

PRIOR ART

In document transports, documents are normally moved by belts and rollers through document guides, and documents may be diverted to different positions by impinging against a deflecting surface which usually require an electrical/mechanical device for actuating. However, in most document transports the document direction is in a single direction and the transports are not reversed so that the document travels in the opposite direction. By being able to reverse the direction of the transport, a more compact unit is available and requires the diversion of the document away from its original input station.

SUMMARY OF THE INVENTION

A small compact transport for entering data into a data bank utilizes a reversible document path wherein the document is placed into a feed station and moved along a guide whereupon the document may be magnetically or optically read and data printed thereon. To reduce the need for a long transport, the belts are reversible moving the document back in the same direction from which it came. However, in order to place the document into a document stacker pocket, it is necessary to deflect the document away from the feed station. To do this a flexible diverter is used adjacent to the feed station wherein when the document is fed, the document will force the diverter gate open, allowing the document to pass through. However, upon reversal of the feed belts, the document will be diverted away from the input feed station into a stacker pocket. The use of the diverter speeds up the operation by diverting the document into a stacker pocket. The operator may immediately place a document in the transport for processing.

The foregoing and other features and technical advances of the invention will be apparent from the following and more detailed description of the preferred embodiment of the invention as illustrated in the accompanying drawings.

Figure 1:
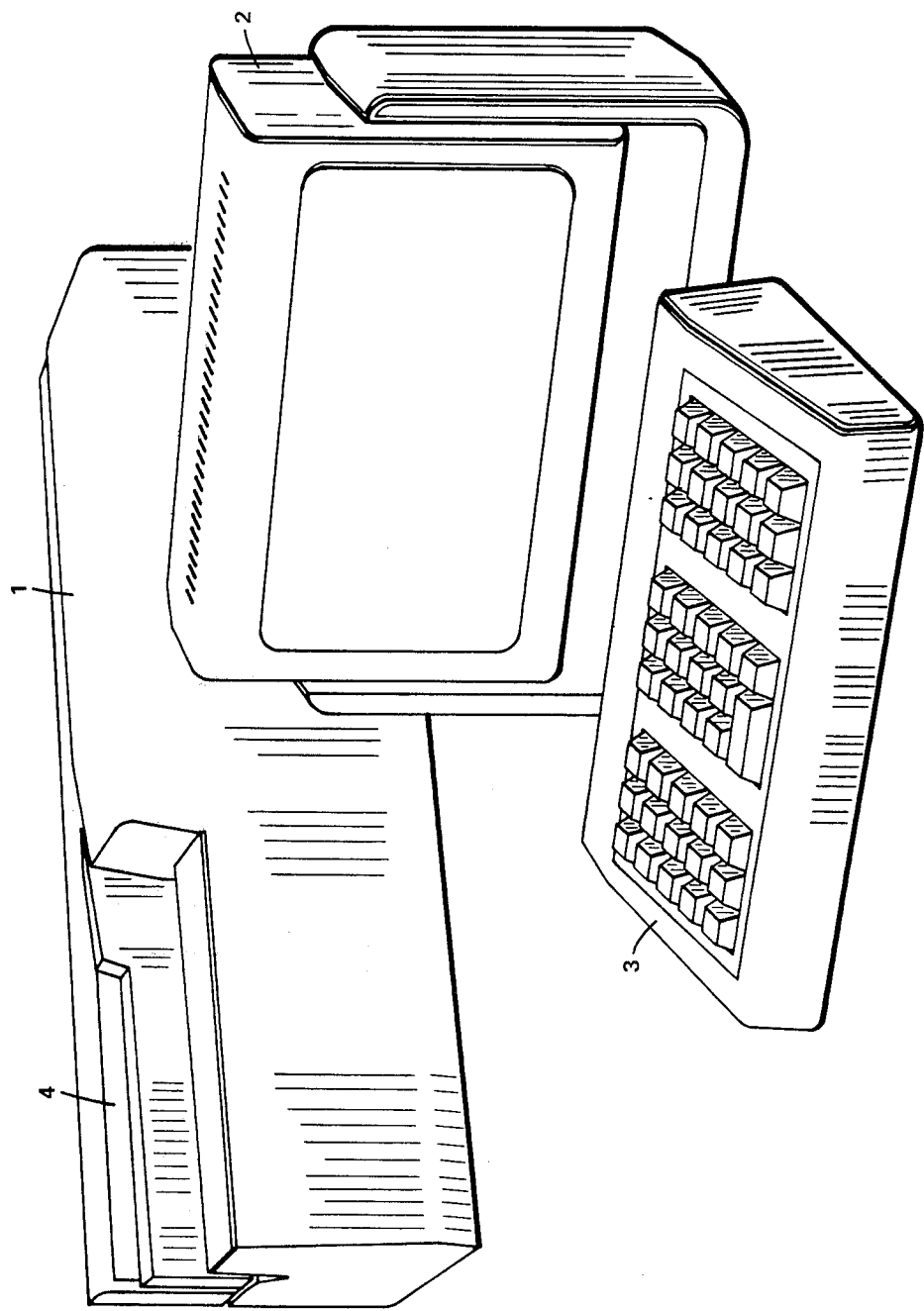
FIG. 1 is a pictorial view of the document transport used in conjunction with a keyboard and display.

Looking at FIG. 1, there is illustrated a pictorial representation of the compact transport 1 used in conjunction with a display 2 and a keyboard 3 which may be used as a bank teller station. A check is deposited in the transport at 4 and the teller can key the amount of the check into the keyboard which will cause the amount thereof to be printed on the check by the printer. The information read or input into the system is shown on the display. The information read from the check and input by the teller is relayed to a central data bank where the information is stored for future use.

Figure 2:
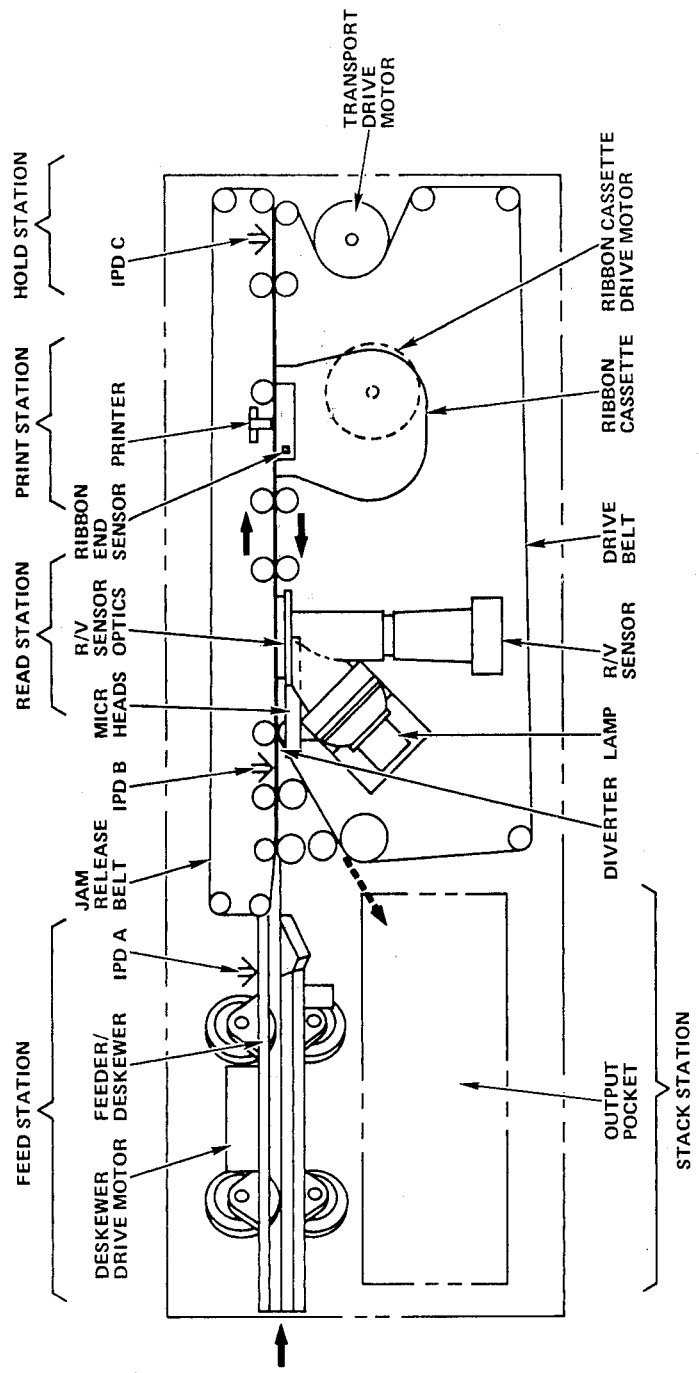
FIG. 2 is a plan illustration of the transport shown in the various processing stations.

FIG. 2 is a representation of the functional portions of the transport showing the various stations and devices within the transport which are actuated by a document being processed through the transport.

As a document is dropped into the feeder, it is sensed by an item presence detector (IPD) at the bottom of the feeder throat. The document is deskewed and advanced forward to the transport belts.

Acting on a timed signal from the feeder IPD, the transport drive motor is initiated and the belts move in a clockwise or left to right mode. The document is pinched between the jam release belt and the pinch roller as the belts accelerate up to a constant speed of 25 in/sec.

Just prior to the read station, the jam release belt engages the drive belt and the leading edge of the document is sensed by a second IPD. This IPD starts a timing clock which tells the down range IPD (No. 3) when to expect the document.

The document passes the read station at constant speed where both magnetic ink characters and bar code lines (if present) are read.

The MICR reader is located directly below the bar code reader where it reads the E13B formatted information. E13B is the designation of the Magnetic Ink Characters usually found on checks. The information is read and sent to storage external to the transport.

If the document has been previously encoded with bar code information, the bar code reader reads and stores it. If there exists no information on the bar code line (approximately 2.125 above document bottom), it is recognized as such and the document proceeds down the belt path.

The document continues to the right, beyond the printer until the leading edge trips the third IPD which is expecting it. If the document fails to reach the third IPD within the expected time, a jam condition is indicated and the belts are stopped. After passing the third IPD, the drive motor stops momentarily and its direction is automatically reversed.

The next operation to be performed is printing. If one field (15 characters) or less is to be printed, the motor will ramp up to the printing position and then start the stepping sequence. If printing between 16 and 27 characters, the drive motor steps immediately as if it were printing.

As the document passes through the print station, it is encoded with a CFC-6 format (as described in U.S. patent application Ser. No. 854,954 filed Nov. 25, 1977) with a fluorescent ink which is transferred from the ¼ inch ribbon in the cassette. After each impact of the hammer, the belts reposition the document at the precise location for the next impact while the print wheel motor repositions the print wheel for the next character.

After the last printed character, the drive motor ramps up to a constant speed of 25 in./sec. and moves the document past the read station. In this mode, the bar code reader acts as a validator to verify that the printer has properly encoded the document.

After passing through the validate station, the document is gated away from the main belt path to the stacker pocket where it is deflected and gravity stacked. As the trailing edge of the processed document passes the second IPD, the transport motor is altered and the sequence may start again.

A plastic or metallic deflector is positioned above and below the belts to allow entering documents in while blocking exiting documents from going back into the feeder.

As the document is fed through the transport, the gate is sprung open by the document and the document passes between the diverter gate and a back plate. As soon as the trailing edge is passed, the diverter returns to a rest position with its end in a recess in the back plate. When the document direction is reversed, it is diverted and is directed into the document pocket.

Figure 3A:
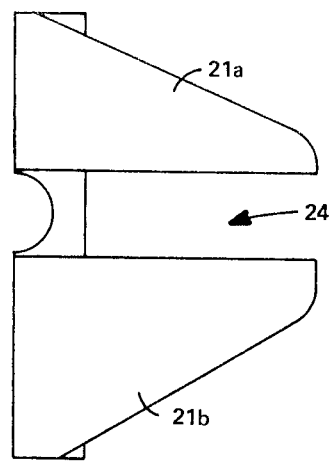
FIGS. 3a, b, and c are detailed illustrations of the diverter device of the present invention.
Figure 3B:
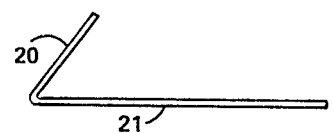
Figure 3C:
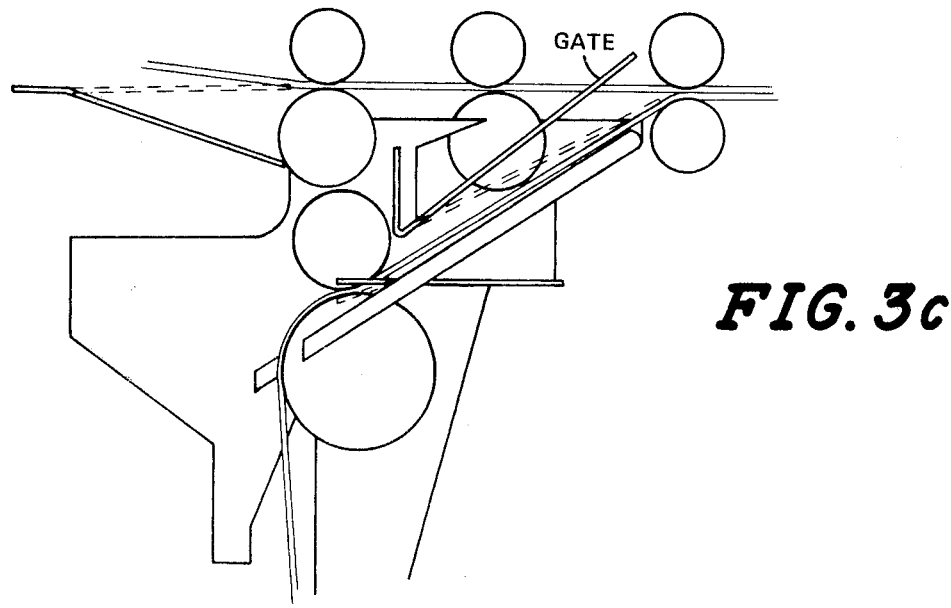

In having a single reversible document path, it is necessary to divert the document from the document input station when the transport drive is reversed. This is accomplished by a unique diverter illustrated in FIGS. 3a, b and c. The diverter is a single piece of flexible metal or plastic which is placed across the document path. When driven in the forward direction, the document flexes the diverter out of its path and passes through the "gate" illustrated in FIG. 3c. After the document has passed through the "gate", the diverter returns to its normal position across the document path. When the transport drive reverses, the document is deflected by the diverter into the output pocket (see FIG. 2).

The diverter is bent so that Section 20 is held fast and Sections 21a and 21b cross the document path. Section 21 has an opening 24 therein to allow the drive belts to pass through the diverter without interference.

Having described a preferred embodiment of the invention, further embodiments and modifications will be suggested to those skilled in the art, which embodiments and modifications are deemed to be within the scope of the invention as defined in the following claims.

What is claimed is:

1. A gate device in a reversible document transport positioned across the path of a belt driven document guide comprising; two flexible fingers and a body portion, said body portion rigidly attached to said transports and said fingers extending from said body portion across the document guide so that documents moving in one direction will flex the fingers aside allowing the document to pass along the document guide, said fingers returning to a position across the guide after the document passes and diverting documents to another path when the documents move in an opposite direction.

2. The gate device according to claim 1 wherein the two flexible fingers are positioned so to allow the transport belt to pass between the fingers without coming into contact with them.

3. The gate device according to claim 1 wherein the portion of the base member between the point the fingers are attached is removed to ensure the fingers flex independent of each other.

4. A document gate device for passing documents in one direction and diverting to a different path in the opposite direction comprising; a base part and two flexible fingers independently secured to the base part, said fingers extending across the path of travel of the documents.

5. The gate device according to claim 4 wherein the documents are moved by a transport belt and said fingers are spaced apart to permit the belt to extend therebetween.

* * * * *